(12) United States Patent
Fjeldsaa

(10) Patent No.: US 11,231,124 B2
(45) Date of Patent: Jan. 25, 2022

(54) ISOLATION VALVE FOR FLUID FLOW REGULATION

(71) Applicant: Oceaneering International, Inc., Houston, TX (US)

(72) Inventor: Morten Fjeldsaa, Vest Agder (NO)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 17/038,164

(22) Filed: Sep. 30, 2020

(65) Prior Publication Data

US 2021/0102641 A1  Apr. 8, 2021

Related U.S. Application Data

(60) Provisional application No. 62/910,355, filed on Oct. 3, 2019.

(51) Int. Cl.
*F16K 3/08* (2006.01)
*F16K 31/46* (2006.01)
(Continued)

(52) U.S. Cl.
CPC ............ *F16K 31/46* (2013.01); *F16K 11/044* (2013.01); *F16K 25/005* (2013.01); *F16K 51/00* (2013.01);
(Continued)

(58) Field of Classification Search
CPC . F16K 3/0218; F16K 3/04; F16K 3/06; F16K 3/085
See application file for complete search history.

(56) References Cited

U.S. PATENT DOCUMENTS

| 2,334,346 | A | * | 11/1943 | Mueller | F16K 3/04 |
| | | | | | 137/637.4 |
| 2,893,430 | A | * | 7/1959 | Holl | F16K 3/04 |
| | | | | | 137/625.42 |

(Continued)

*Primary Examiner* — Robert K Arundale
(74) *Attorney, Agent, or Firm* — Maze IP Law, P.C.

(57) ABSTRACT

An isolation valve can be used subsea such as with a fluid handling system which may be associated with a subsea Christmas tree and comprises a housing comprising a material created by a sintering process and a vertical axis defined in-between a first housing end and a second housing end; two or more seats comprising a sintered material and disposed radially opposite each other; a first annulus extending through a predetermined portion of the second housing end and the first seat at a first position radially offset from and substantially parallel to the vertical axis; a second annulus extending through a predetermined portion of the second housing end and the second seat at a second position radially offset from the first annulus along the vertical axis and substantially parallel to the housing vertical axis; a first fluid port disposed through the second end of the housing and in fluid communication with the first annulus; second fluid port disposed through the second end of the housing and in fluid communication with the second annulus; and an actuator disposed at least partially within the housing and rotatable about the vertical axis of the housing, the actuator comprising a sintered material, the actuator configured to allow fluid flow in a first rotational position of the actuator and block fluid communication in a second rotational position of the actuator, and a predetermined surface uniformly machined to a surface of the first seat which is exposed to the fluid annulus and to a surface of the second seat which is exposed to the fluid annulus, the predetermined surface defining a metal-to-metal seal at the exposed surfaces of the first seat and the second seat when the actuator is in the second rotation position.

20 Claims, 4 Drawing Sheets

(51) Int. Cl.
*F16K 51/00* (2006.01)
*F16K 25/00* (2006.01)
*F16K 11/044* (2006.01)

(52) U.S. Cl.
CPC ......... *F16K 3/08* (2013.01); *Y10T 137/86863* (2015.04)

(56) References Cited

U.S. PATENT DOCUMENTS

| | | | | |
|---|---|---|---|---|
| 4,756,647 | A * | 7/1988 | Fassbinder | B65G 53/4616 406/131 |
| 2016/0264223 | A1* | 9/2016 | Ferguson | B63G 8/001 |
| 2018/0163879 | A1* | 6/2018 | Smith, III | F16K 11/0743 |

* cited by examiner

ISOLATION VALVE FOR FLUID FLOW REGULATION

TECHNICAL FIELD

The invention relates generally to a field of flow control valves and more particularly, to an isolation valve used in a fluid handling system for deep sea operations.

BACKGROUND

Isolation valves are used in a fluid handling system for controlling the flow of subsea fluids. Generally, isolation valves act as a safety device while transporting subsea fluids from one location to another. These valves also help in easy maintenance of devices and equipment connected in the fluid handling system. Isolation valves can also provide flow logics, i.e. selecting one flow path versus another, and can assist in connecting external equipment to a fluid handling system.

In petroleum and natural gas extraction, typically a Christmas tree is installed that regulates fluid flow through pipes in an oil and gas well, water injection well, water disposal well, gas injection well, condensate well and other types of wells. The primary function of a Christmas tree is to control the fluid flow, usually oil or gas, out of the well. Accordingly, Christmas trees are typically equipped with valves, spools, and fittings for regulating fluid flow. In general, a Christmas tree includes several isolation valves that maintain the fluid flow and allow connecting external equipment to the Christmas tree.

The existing isolation valves used in the Christmas tree are not reliable, as they tend to leak after prolong usage and such leakage leads to safety issues and as well as production losses. Also, typical isolation valves use full face seals and require pressure from back to affect the seal; therefore, sealing is only performed on the output side. Moreover, over pressurizing of the valve leads to heating of the fluid inside the valve annulus and results in leakage. In addition, most of the existing design uses thermal spray on the seat of the isolation valve that results in an unpredictable surface and enhances leakage in the isolation valves.

Existing isolation valve are not reliable in terms of leakage for their usage in high temperature and high-pressure deepwater conditions. Thus, an isolation valve is required which is reliable and provides effective sealing for the leakage in deep water applications.

BRIEF DESCRIPTION OF THE DRAWINGS

Various figures are included herein which illustrate aspects of embodiments of the disclosed inventions.

DESCRIPTION OF EXEMPLARY EMBODIMENTS

Figure 1:
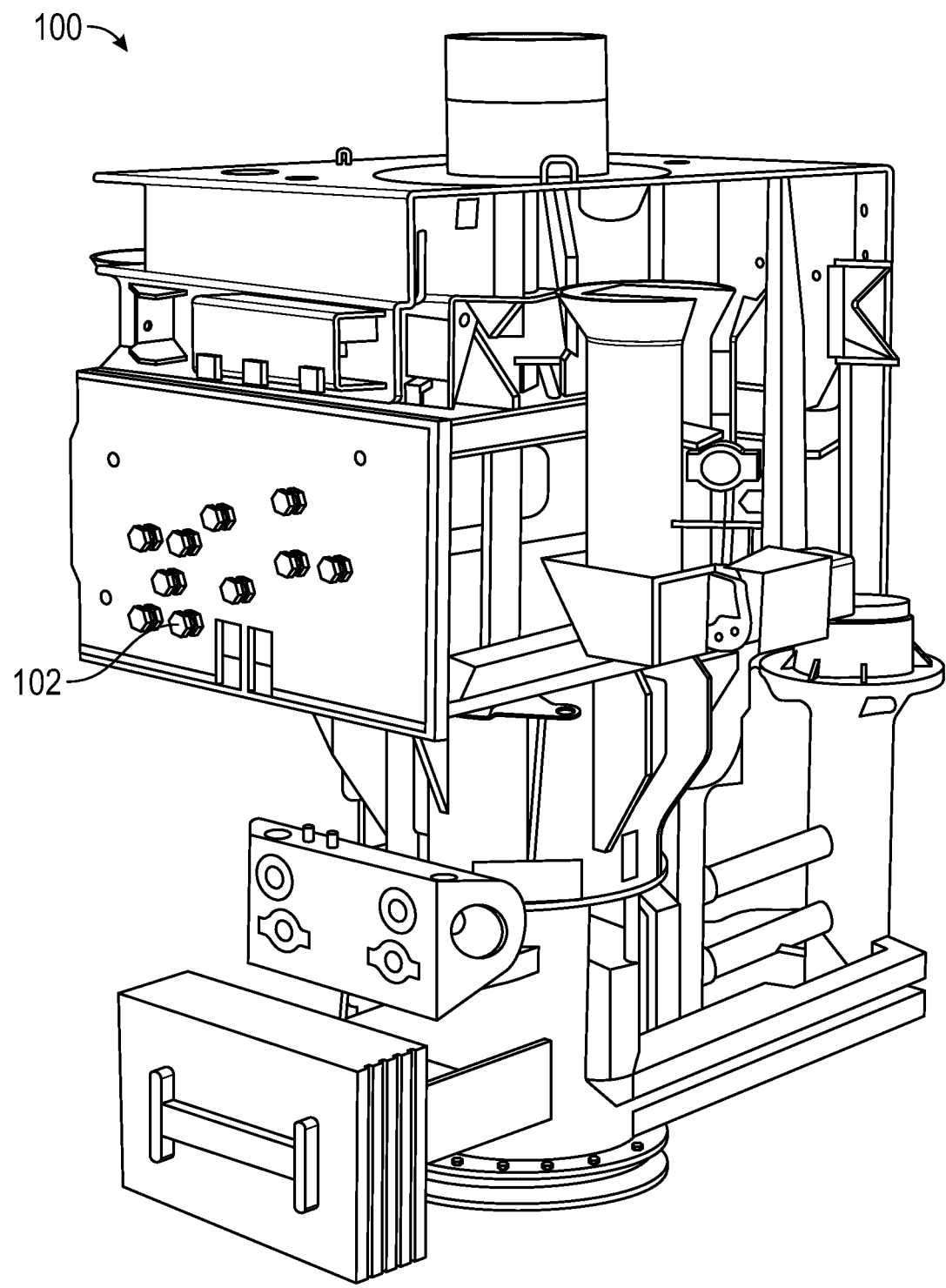
FIG. 1 illustrates an isolation valve on a fluid handling system, in accordance with an embodiment of the invention
Figure 2:
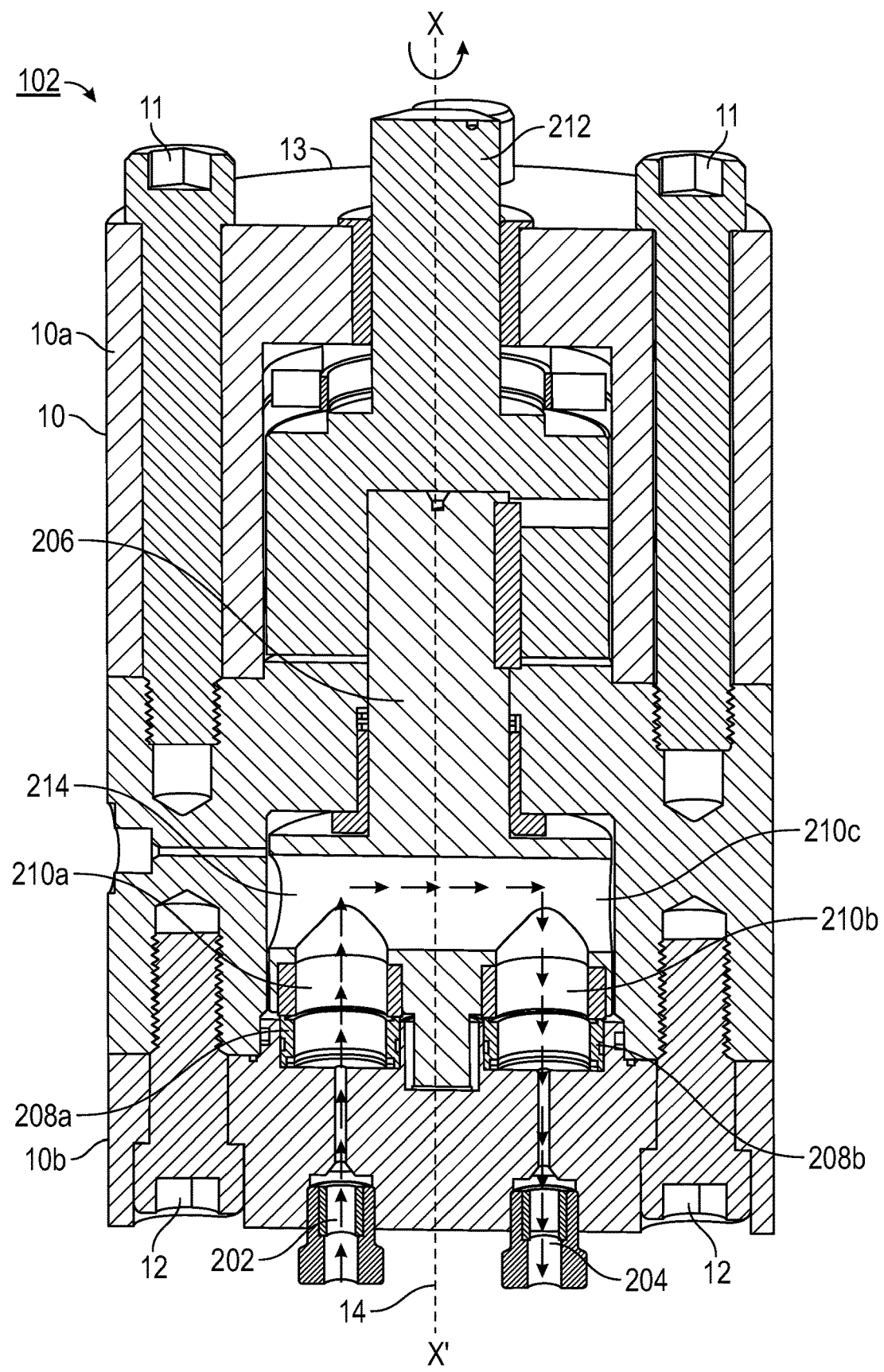
FIG. 2 illustrates a cross-section of the isolation valve in open position, in accordance with an embodiment of the invention.

Referring now to FIG. 2, isolation valve 102, which is suitable for use in fluid handling system 100, is typically configured to couple onto fluid handling system 100 (FIG. 1). In an embodiment isolation valve 102 comprises housing 10 which defines vertical axis X-X' in-between first housing end 13 and second housing end 14 through a center of housing 10; two or more seats (generally referred to as "208") such as first seat 208a and second seat 208, disposed radially opposed each other at least partially within housing 10 proximate second end 14; first annulus 210a disposed within a portion of second housing end 14 and extending through first seat 208a at a first position radially offset from and substantially parallel to vertical axis X-X'; second annulus 210b disposed within a portion of second housing end 14 through second seat 208b at a second position radially offset from first annulus 210a and vertical axis X-X' and substantially parallel to vertical axis X-X'; a set of fluid ports corresponding to seats 208, e.g. first fluid port 202 disposed through second end 14 and in fluid communication with first annulus 210a and second fluid port 204 disposed through second end 14 and in fluid communication with second annulus 210b; and actuator 206 disposed at least partially within housing 10 and rotatable about vertical axis X-X' of housing 10.

Housing 10 is typically configured to allow functioning of isolation valve 102 at a pressure range of between 300 bar to 1500 bar such as by use of a sintering process to manufacture one or more components of housing 10.

In embodiments, housing 10 further comprises first housing section 10a and second housing section 10b connected or otherwise fastened to first housing section 10a. In these embodiments, actuator 206 is typically disposed at least partially within each of first housing section 10a and second housing section 10b. Further, fluid annulus 210c is typically totally disposed within second housing section 10b.

In embodiments, each seat 208 comprises a sintered material such as aluminum, copper, bronze, nickel, brass, steel, stainless steel, nickel, titanium, ceramic, or the like, or a combination thereof. In embodiments, each seat 208 is also manufactured using a sintering process and may comprise tungsten and/or a ceramic.

Actuator 206 typically also comprises a sintered material, and may comprise tungsten and/or a ceramic, and the entire actuator 206 may itself be manufactured using a sintering process. In accordance with an embodiment of the invention, the seat 208 and actuator 206 are manufactured by a sintering process. Sintering processes reduces the porosity and enhances strength properties of the seat 208 and actuator 206.

In accordance with an embodiment of the invention, the material of the seat 208 and actuator 206 is one of but not limited to tungsten and ceramic or the combination. Thus, it is obvious for a person to use any other hard material, apart from the material mentioned above having similar properties to the material used for the seat 208 and actuator 206. In addition, the material such as but not limited to tungsten and ceramic reduces the friction and reduces the operating force required for opening and closing of isolation valve 102. Since seat 208 and actuator 206 comprise materials manufactured by a sintering process and their various surfaces are uniformly machined, their surface's finish can provide an efficient and reliable sealing on the inlet of first port 202. Further, due to the selection of material, sintering process, and mechanism of operation of actuator 206, sealing effectiveness is improved and zero leakage is reliably achieved in isolation valve 102. Moreover, fluid is typically not trapped in membrane 214 and annulus 210 of actuator 206, thus reducing of not eliminating over-pressurization and heating of internal components of isolation valve 102 which further results in prolonged cycling capability of isolation valve 102.

Figure 4A:
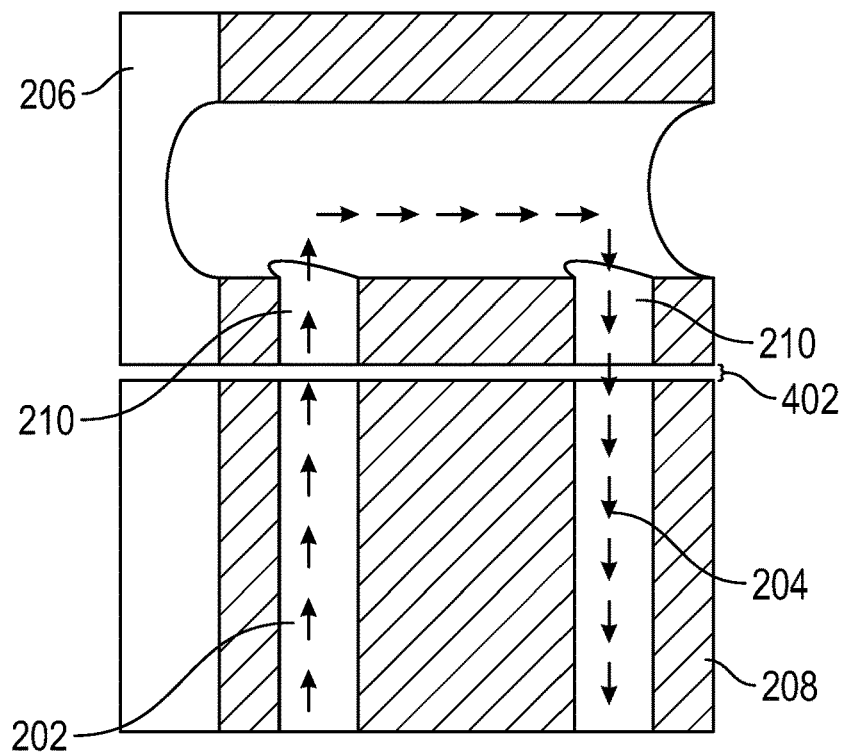
FIG. 4A and FIG. 4B illustrate an exemplary slide unit and ports, in accordance with an embodiment of the invention.
Figure 4B:
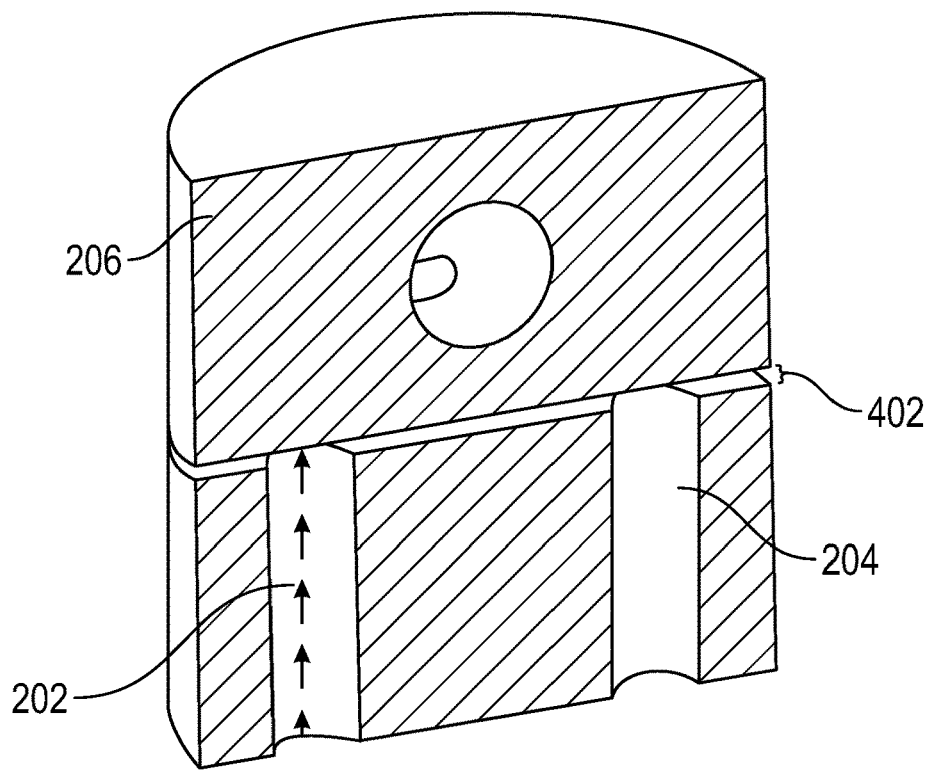

In embodiments, actuator 206 comprises fluid annulus 210c disposed through a portion of actuator 206 which typically extends from a lower portion of actuator 206 disposed proximate first annulus 210a and second annulus 210b with respect to and perpendicular to vertical axis X-X'. As illustrated in FIG. 4a and FIG. 4b, fluid annulus 210c is in fluid communication with first annulus 210a through first seat 208a and with second annulus 210b through second seat 208b when actuator 206 is in a first rotational position (FIG. 4a) and blocks fluid communication with first annulus 210a and second annulus 210b when in a second rotational position (FIG. 4b). Actuator 206 further typically comprises a predetermined surface uniformly machined to a surface of first seat 208a which is exposed to fluid annulus 210c and to a surface of second seat 208a which is exposed to fluid annulus 210c. The predetermined surface of actuator 208 typically defines a metal-to-metal seal at the intersection of the predetermined surface of actuator 208 and the exposed surfaces of first seat 208a and second seat 208b such as when actuator 206 is in the second rotation position.

In most embodiments, the second position of second annulus 210b is diagonally offset from first annulus 210a.

In certain embodiments, membrane 214 is disposed about an inner portion of annulus 210 and is operative to minimize trapping of fluid in membrane 214 and annulus 210.

First port 202 and the second port 204 are in communication with seats 208 and are typically bi-directional ports. In embodiments, first fluid port 202 and second fluid port 204 may each comprise sleeve 203. For better understanding of the invention, first port 202 is shown as an inlet port and second port 204 is shown as an outlet port but in practice both ports 202 and 204 may be bi-directional ports, each of which can work as an inlet port or outlet port.

In certain embodiments, isolation valve 102 further comprises spindle 212 rotatably disposed at least partially within housing 10 where spindle 212 is rotatable about vertical axis X-X' and operatively connected to actuator 206 such that spindle 212 is operative to cooperatively rotate actuator 206. In these embodiments, isolation valve 102 may further comprise a torque interface operatively connected to spindle 212 where the torque interface may configured to interface with a remotely operation vehicle (ROV), an autonomous underwater vehicle (AUV), or the like or for manual rotation by a diver using a torque tool.

In the operation of exemplary embodiments, fluid flow may be controlled using isolation valve 102 by operatively connecting isolation valve 102, as described above, to fluid handling system 100; rotating actuator 206 to a first position in which annulus 210c is in fluid communication with first fluid port 202 and second fluid port 204 to permit fluid flow; allowing fluid to flow in-between first fluid port 202 and second fluid port 204 via annulus 210; and, as fluid passes through annulus 210, allowing the fluid to pass through membrane 214.

When fluid flow occlusion is desired, actuator 206 may be rotated to a second position in which annulus 210c is no longer in fluid communication with first fluid port 202 and second fluid port 204, thereby sealing first fluid port 202 and second fluid port 204 from further fluid flow. In this occluding position, the predetermined surface of actuator 208 typically defines a metal-to-metal seal at the intersection of the predetermined surface of actuator 208 and the exposed surfaces of first seat 208a and second seat 208b.

Figure 3:
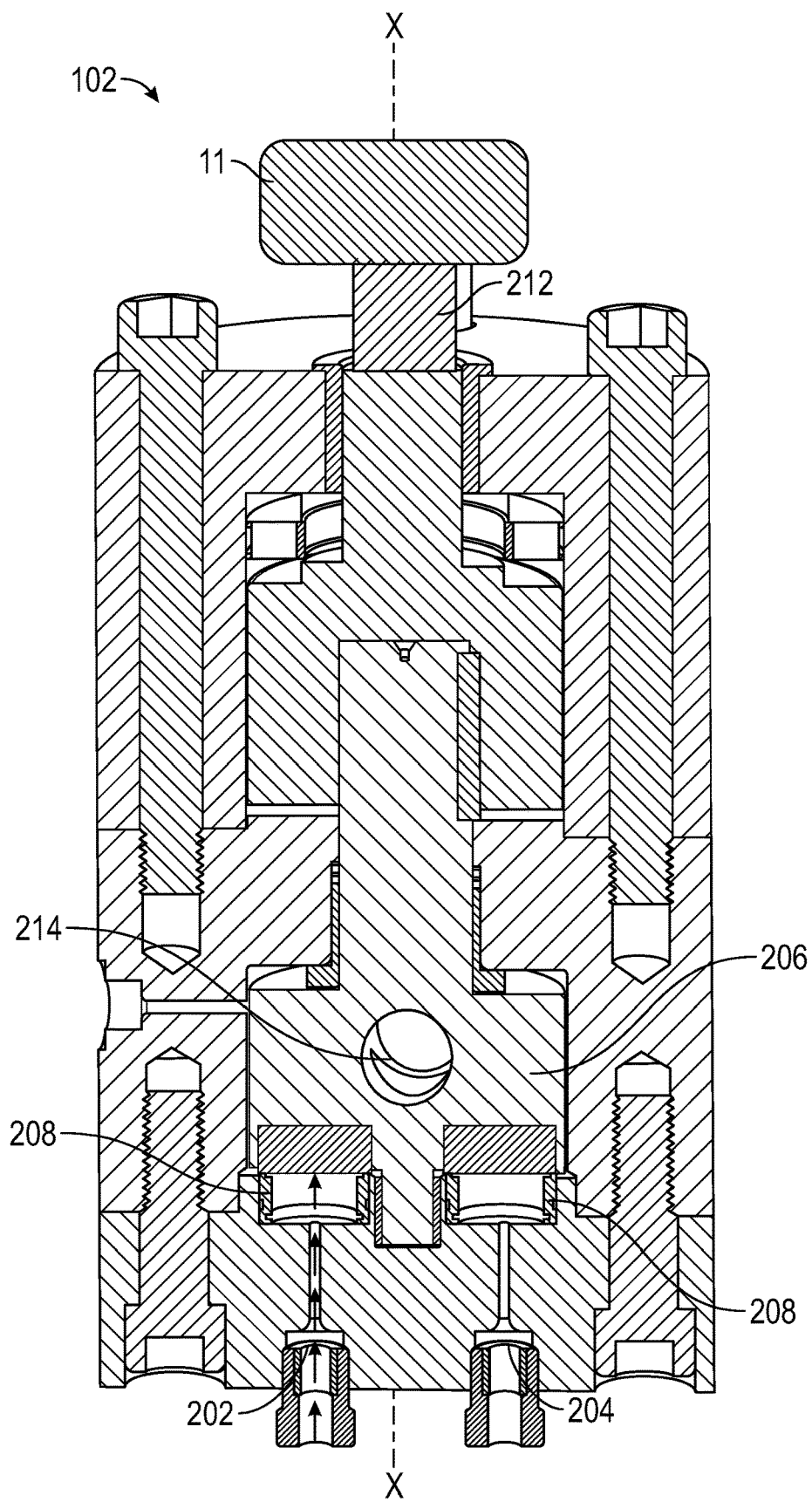
FIG. 3 illustrates a cross-section of the isolation valve in closed position, in accordance with an embodiment of the invention.

Typically, rotation of actuator 206 is accomplished by turning spindle 212 within housing 10 about vertical axis X-X', such as by an ROV, AUV, or diver using torque tools, operatively in communication with actuator 206 to achieve a desired rotational position of actuator 206 withing housing 10. In embodiments, rotation of actuator 206 by a quarter turn is sufficient to effectuate or prevent fluid flow. FIG. 3 illustrates a cross-section of isolation valve 102 in a closed position.

Due to the rotation of actuator 206, metal to metal sealing may be accomplished between seats 208 and actuator 206. In FIG. 4A and FIG. 4B, gap 402 is shown for ease of understanding but, in practice, there is no gap 402 between seats 208 and actuator 206. In this manner, actuator 206 is capable of sealing first port 202 in order to block the entry of fluid into annulus 210c. One of the advantages of isolation valve 102 is that no pressure is required to perform sealing in isolation valve 102, as metal to metal sealing is formed between the seat 208 and actuator 206. Moreover, due to sealing mechanism used in invention, both ports 202 and 204 are efficiently sealed. In addition, the sealing at both ends of ports 202 and 204 allows bi-directional operation of isolation valve 102. Moreover, the metal to metal sealing results in efficient and reliable sealing.

Another advantage includes a reduction if not elimination of fluid pressure inside internal components of isolation valve 102. This further increases the life of isolation valve 102.

As noted above, various components comprise sintered material or are manufactured by a sintering process. Typically, the sintering process and the material selected for forming metal to metal sealing offers very low friction which further reduced the force required for operating isolation valve 102.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. An isolation valve, comprising: a. a housing defining a vertical axis in-between a first housing end and a second housing end through a center of the housing, the housing comprising a material created by a sintering process and configured to allow functioning of the isolation valve at a pressure range of between 300 bar to 1500 bar; b. a first seat and a second seat, each seat disposed at least partially within the housing proximate the second end of the housing, each seat comprising a sintered material, the first seat disposed radially opposite the second seat; c. a first annulus disposed within a predetermined portion of the second housing end and extending through the first seat at a first position radially offset from and substantially parallel to the vertical axis; d. a second annulus disposed within a predetermined portion of the second housing end through the second seat at a second position radially offset from the first annulus along the vertical axis and substantially parallel to the housing vertical axis; e. a first fluid port disposed through the second end of the housing and in fluid communication with the first annulus, the first fluid port further comprising a first sleeve; f. second fluid port disposed through the second end of the housing and in fluid communication with the second annulus, the second fluid port further comprising a second sleeve; and g. an actuator disposed at least partially within the housing and rotatable about the vertical axis of the housing, the actuator comprising a sintered material, the actuator further comprising: i. an actuator fluid annulus disposed through the predetermined portion of the actuator away from the first annulus and the second annulus with respect to and perpendicular to the housing vertical axis, the actuator fluid annulus in fluid communication with the first annulus through the first seat and the second annulus through the second seat in a first rotational position of the actuator and blocking fluid communication with the first annulus and the second annulus in a second rotational position of the actuator; and ii. a predetermined surface uniformly machined to a surface of the first seat which is exposed to the actuator fluid annulus and to a surface of the second seat which is exposed to the actuator fluid annulus, the predetermined surface defining a metal-to-metal seal at the exposed surfaces of the first seat and the second seat when the actuator is in the second rotation position.

2. The isolation valve of claim 1, further comprising a membrane disposed about an inner portion of the actuator fluid annulus, the membrane operative to minimize trapping of fluid in the membrane and actuator fluid annulus.

3. The isolation valve of claim 1, wherein the housing further comprises:
   a. a first housing section; and
   b. a second housing section connected to the first housing section.

4. The isolation valve of claim 3, wherein the actuator is disposed at least partially within the first housing section and the second housing section.

5. The isolation valve of claim 3, wherein the actuator is disposed at least partially within the first housing section and the second housing section such that the actuator fluid annulus is totally disposed within the second housing section.

6. The isolation valve of claim 1, wherein the first port and the second port are in fluid communication with their respective seats.

7. The isolation valve of claim 1, wherein the isolation valve is configured to fluidly couple onto a fluid handling system.

8. The isolation valve of claim 1, wherein each of the first port and the second port comprises a bi-directional port.

9. The isolation valve of claim 1, further comprising a spindle rotatably disposed at least partially within, and rotatable about the vertical axis of the housing, the spindle operatively connected to the actuator and operative to cooperatively rotate the actuator.

10. The isolation valve of claim 9, further comprising a torque interface operatively connected to the spindle.

11. The isolation valve of claim 10, wherein the torque interface is configured to interface with a remotely operation vehicle (ROV) or autonomous underwater vehicle (AUV).

12. The isolation valve of claim 10, wherein the torque interface is configured for manual rotation by a diver using a torque tool.

13. The isolation valve of claim 1, wherein each seat and the actuator comprise tungsten and/or a ceramic.

14. An isolation valve, comprising: a. a housing defining a vertical axis in-between a first housing end and a second housing end through a center of the housing, the housing comprising a material created by a sintering process and configured to allow functioning of the isolation valve at a pressure range of between 300 bar to 1500 bar; b. a first seat and a second seat, each seat disposed at least partially within the housing proximate the second end of the housing, each seat comprising a sintered material, the first seat disposed radially opposite the second seat; c. a first annulus disposed within a predetermined portion of the second housing end and extending through the first seat at a first position radially offset from and substantially parallel to the vertical axis; d. a second annulus disposed within a predetermined portion of the second housing end through the second seat at a second position radially offset from the first annulus along the vertical axis and substantially parallel to the housing vertical axis; e. a first fluid port disposed through the second end of the housing and in fluid communication with the first annulus; f. second fluid port disposed through the second end of the housing and in fluid communication with the second annulus; and g. an actuator disposed at least partially within the housing and rotatable about the vertical axis of the housing, the actuator comprising a sintered material, the actuator further comprising: i. an actuator fluid annulus disposed through the predetermined portion of the actuator away from the first annulus and the second annulus with respect to and perpendicular to the housing vertical axis, the actuator fluid annulus in fluid communication with the first annulus through the first seat and the second annulus through the second seat in a first rotational position of the actuator and blocking fluid communication with the first annulus and the second annulus in a second rotational position of the actuator; and ii. a predetermined surface uniformly machined to a surface of the first seat which is exposed to the actuator fluid annulus and to a surface of the second seat which is exposed to the actuator fluid annulus, the predetermined surface defining a metal-to-metal seal at the exposed surfaces of the first seat and the second seat when the actuator is in the second rotation position; and a membrane disposed about an inner portion of the actuator fluid annulus, the membrane operative to minimize trapping of fluid in the membrane and actuator fluid annulus.

15. A method of controlling fluid flow in an isolation valve which comprises a housing defining a vertical axis in-between a first housing end and a second housing end, the housing comprising a material created by a sintering process and configured to allow functioning of the isolation valve at pressure range of between 300 bar to 1500 bar; a first seat and a second seat, each disposed at least partially within the housing proximate the second end of the housing, each seat comprising a sintered material, the first seat disposed radially opposite the second seat; a first annulus disposed within a predetermined portion of the second housing end and extending through the first seat at a first position radially offset from and substantially parallel to the vertical axis; a second annulus disposed within a predetermined portion of the second housing end through the second seat at a second position radially offset from the first annulus along the vertical axis and substantially parallel to the housing vertical axis; a first fluid port disposed through the second end of the housing and in fluid communication with the first annulus, the first fluid port further comprising a first sleeve; second fluid port disposed through the second end of the housing and in fluid communication with the second annulus, the second fluid port further comprising a second sleeve; and an actuator disposed at least partially within the housing and rotatable about the vertical axis of the housing, the actuator comprising a sintered material, the actuator further comprising an actuator fluid annulus disposed through the predetermined portion of the actuator away from the first annulus and the second annulus with respect to and perpendicular to the housing vertical axis, the actuator fluid annulus in fluid communication with the first annulus through the first seat and the second annulus through the second seat in a first rotational position of the actuator and blocking fluid communication with the first annulus and the second annulus in a second rotational position of the actuator and a predetermined surface uniformly machined to a surface of the first seat which is exposed to the actuator fluid annulus and to a surface of the second seat which is exposed to the actuator fluid annulus, the predetermined surface defining a metal-to-metal seal at the exposed surfaces of the first seat and the second seat when the actuator is in the second rotation position, the method comprising: a. operatively connecting the isolation valve to a fluid handling system; b. rotating the actuator about the vertical axis about the predetermined surface uniformly machined to the surface of the first seat which is exposed to the actuator fluid annulus and to the surface of the second seat which is exposed to the actuator fluid annulus to a first position in which the actuator fluid annulus is in fluid communication with the first fluid port and the second fluid port; and c. allowing fluid to flow in-between the first fluid port and the second fluid port via the actuator fluid annulus.

16. The method of controlling fluid flow in an isolation valve of claim 15, wherein the isolation valve further comprises a membrane disposed about an inner portion of the actuator fluid annulus, the membrane operative to minimize trapping of fluid in the membrane and the actuator fluid annulus, the method further comprising allowing the fluid to pass through the membrane as fluid passes through the actuator fluid annulus.

17. The method of controlling fluid flow in an isolation valve of claim 15, further comprising rotating the actuator to a second position in which the actuator fluid annulus is no longer in fluid communication with the first fluid port and the second fluid port, thereby sealing the first fluid port and the second fluid port from further fluid flow.

18. The method of controlling fluid flow in an isolation valve of claim 15, wherein the isolation valve further comprises a spindle rotatably disposed at least partially within the housing and rotatable about the vertical axis of the housing, the spindle operatively connected to the actuator and operative to cooperatively rotate the actuator, wherein rotating the actuator further comprises rotating the spindle to a desired position.

19. The method of controlling fluid flow in an isolation valve of claim 15, wherein rotation of the actuator by a quarter turn is sufficient to effectuate or prevent fluid flow.

20. The method of controlling fluid flow in an isolation valve of claim 15, wherein rotation of the actuator is accomplished by a remotely operated vehicle operatively in communication with the actuator, by an autonomously operated vehicle operatively in communication with the actuator, or by a human diver.

* * * * *